(12) United States Patent
Lewis et al.

(10) Patent No.: US 12,392,043 B2
(45) Date of Patent: Aug. 19, 2025

(54) RECHARGEABLE ELECTROLYSIS CELL

(71) Applicants: Morgan Burton Lewis, Williamsville, NY (US); Eric Joseph Maziol, Miami Beach, FL (US)

(72) Inventors: Morgan Burton Lewis, Williamsville, NY (US); Eric Joseph Maziol, Miami Beach, FL (US)

( * ) Notice: Subject to any disclaimer, the term of this patent is extended or adjusted under 35 U.S.C. 154(b) by 856 days.

(21) Appl. No.: 17/444,246

(22) Filed: Aug. 2, 2021

(65) Prior Publication Data
US 2022/0033981 A1 Feb. 3, 2022

Related U.S. Application Data

(60) Provisional application No. 63/059,658, filed on Jul. 31, 2020.

(51) Int. Cl.
| | |
|---|---|
| *H01M 8/00* | (2016.01) |
| *C25B 1/24* | (2021.01) |
| *C25B 9/19* | (2021.01) |
| *C25B 9/65* | (2021.01) |
| *C25B 11/031* | (2021.01) |

(Continued)

(52) U.S. Cl.
CPC ............... *C25B 9/65* (2021.01); *C25B 1/24* (2013.01); *C25B 9/19* (2021.01); *C25B 11/031* (2021.01); *C25B 11/043* (2021.01); *C25B 13/00* (2013.01); *C25B 15/083* (2021.01);
(Continued)

(58) Field of Classification Search
CPC ........................ H01M 8/04119; C25B 11/043; C25B 11/031; Y02E 60/10
See application file for complete search history.

(56) References Cited

U.S. PATENT DOCUMENTS

| | | |
|---|---|---|
| 7,233,079 B1 | 6/2007 | Cooper |
| 7,459,064 B2 | 12/2008 | Anderson |

(Continued)

FOREIGN PATENT DOCUMENTS

| | | | | |
|---|---|---|---|---|
| WO | WO-2011162026 A1 * | 12/2011 | ............. | H01B 1/122 |
| WO | WO-2017125469 A1 * | 7/2017 | ........... | C07D 301/26 |

OTHER PUBLICATIONS

Furuya, Conductive-Material Manufacturing Method, Conductive Material, and Battery, Dec. 29, 2011, See the Abstract. (Year: 2011).*

(Continued)

*Primary Examiner* — Niki Bakhtiari
*Assistant Examiner* — Monique M Wills
(74) *Attorney, Agent, or Firm* — Dunlap Bennett & Ludwig, PLLC; Anna L. Kinney

(57) ABSTRACT

A rechargeable electrolysis cell includes: an anode; a cathode; an electrical connection; and an electrolyte. The cathode has an inlet for an oxidizer. The reducing agent is a solvated metal ligand, a Birch electron, a solvated electron, metal salt, or a metallic plating on the cathode. The oxidizer is a halogen. A method of discharging the cell includes providing the reducing agent at the anode and delivering the oxidizer to the cathode and transferring an electron from the anode through an electrical load, oxidizing the reducing agent and reducing the oxidizer to produce a salt dissolved in the electrolyte. Charging the cell includes applying direct current to convert the salt to the reducing agent and the oxidizer and separating the reagents.

4 Claims, 5 Drawing Sheets

(51) Int. Cl.
  *C25B 11/043*      (2021.01)
  *C25B 13/00*       (2006.01)
  *C25B 15/08*       (2006.01)
  *H01M 8/04119*     (2016.01)
  *H01M 8/18*        (2006.01)
  *H01M 8/22*        (2006.01)

(52) U.S. Cl.
  CPC ....... *H01M 8/04119* (2013.01); *H01M 8/184* (2013.01); *H01M 8/22* (2013.01)

(56) References Cited

U.S. PATENT DOCUMENTS

| | | |
|---|---|---|
| 8,803,344 B2 | 8/2014 | Kyriakides et al. |
| 9,768,461 B2 | 9/2017 | Salmond et al. |
| 10,164,429 B1 | 12/2018 | Combs |
| 10,208,665 B2 | 2/2019 | Simpson |
| 10,340,693 B2 | 7/2019 | Lansing, Jr. et al. |
| 2008/0096064 A1 | 4/2008 | Elia |
| 2010/0101955 A1 | 4/2010 | Nocera et al. |
| 2013/0288143 A1 | 10/2013 | Lee |
| 2014/0298810 A1 | 10/2014 | Robinson |
| 2016/0006066 A1 | 1/2016 | Robertson |
| 2016/0248137 A1 | 8/2016 | Curien et al. |
| 2016/0362799 A1 | 12/2016 | Ramos Agundo |
| 2018/0331369 A1 | 11/2018 | Kumta et al. |

OTHER PUBLICATIONS

Kraus et al., Electrolysis System and Method for Electrochemical Ethylene Oxide Production, Jul. 27, 2017, See the Abstract. (Year: 2017).*

* cited by examiner

RECHARGEABLE ELECTROLYSIS CELL

CROSS-REFERENCE TO RELATED APPLICATION

This application claims the benefit of priority of U.S. provisional application No. 63/059,658, filed Jul. 31, 2020, the contents of which are herein incorporated by reference.

BACKGROUND OF THE INVENTION

The present invention relates to energy storage and, more particularly, to a rechargeable electrolysis cell.

Currently, the most prominent options for energy storage and/or generation are fuel-cells, liquid fuels, gaseous hydrocarbon fuels, and batteries. All these methods have disadvantages.

Fuel cells are not a means to store energy but are a means to generate it through converting chemical potential energy. Currently available fuel cells use hydrogen or natural gas. These fuels are not carbon neutral. While hydrogen can be environmentally friendly, its energy density is poor. There is no widespread distribution system and hydrogen is difficult to store and transport. Natural gas has similar storage problems, emits greenhouse gases, and is a non-renewable resource.

Hydrocarbon fuels generate greenhouse gases, are non-renewable, and they require infrastructure to distribute. Liquid fuels have an advantage in that this infrastructure is present. Devices that run on liquid or gaseous hydrocarbon fuels require constant input of fuel and cannot utilize the currently existing electrical infrastructure.

There is widespread application of electric motors in the electric car and trucking industries. Batteries lack the energy density and durability required for wide implementation for transportation purposes and trucking. Batteries must be very large and cumbersome to provide charge capacities needed for large applications like electric vehicles.

As can be seen, there is a need for an environmentally friendly, compact, durable energy storage device with high energy density that is compatible with existing electrical infrastructure.

SUMMARY OF THE INVENTION

The present invention provides a rechargeable electrolysis cell that offers a superior means of storing electrical power with respect to energy density, reliability, and efficiency. With energy densities theoretically higher than liquid fuels, application of electric motors in industries that traditionally use fossil fuel such as aircraft may be possible. Any application where a battery or fuel cell may have been used, there now exists a better alternative that only requires electricity as an input.

In one aspect of the present invention, a rechargeable electrolysis cell is provided, comprising: an anode; a cathode having an inlet for an oxidizer; an electrical connection between the anode and the cathode; an electrolyte; and a reducing agent selected from the group consisting of a solvated metal ligand, a Birch electron, a solvated electron, and a metallic plating on the cathode; wherein the oxidizer is a halogen.

In another aspect of the present invention, a method of charging and discharging a rechargeable electrolysis cell is provided, comprising: providing a rechargeable electrolysis cell, comprising: an anode; a cathode having an inlet for an oxidizer; an electrical connection between the anode and the cathode; and an electrolyte; and a reducing agent selected from the group consisting of a solvated metal ligand, a Birch electron, a solvated electron, metal crystal, and a metallic plating on the cathode; wherein the oxidizer is a halogen; wherein discharging comprises providing the reducing agent at the anode and delivering the oxidizer to the cathode; and transferring an electron from the anode to the cathode by way of the electrical connection through an electrical load, such that the reducing agent is oxidized and the oxidizer is reduced, producing a salt dissolved in the electrolyte; and wherein charging comprises applying direct current to convert the salt to the reducing agent and the oxidizer; and separating the reducing agent and the oxidizer.

These and other features, aspects and advantages of the present invention will become better understood with reference to the following drawings, description, and claims.

DETAILED DESCRIPTION OF THE INVENTION

Figure 1:
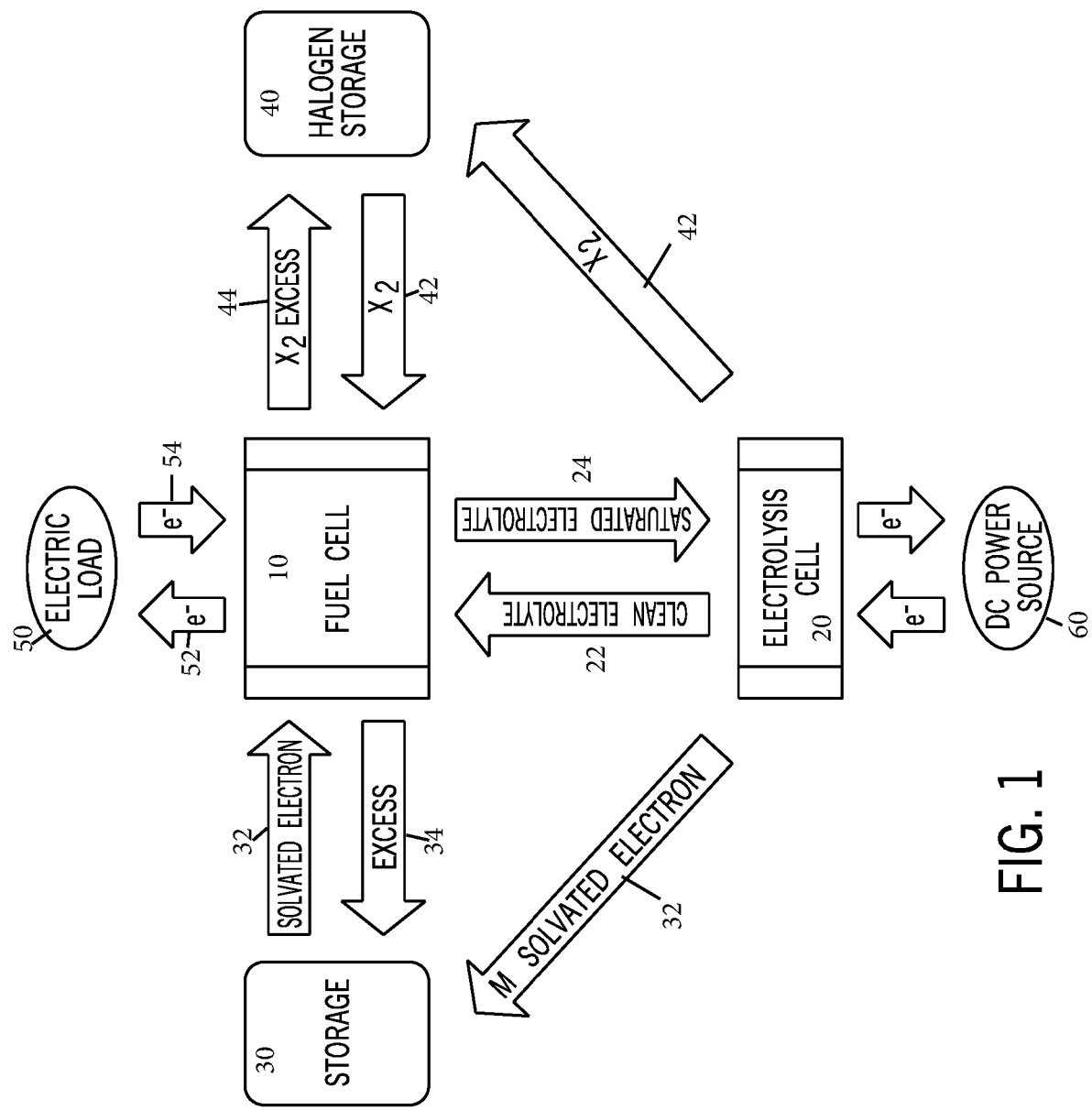
FIG. 1 is a schematic diagram of a rechargeable electrolysis cell system according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

As used herein, "energy density" refers to the amount of energy stored per unit volume.

Broadly, one embodiment of the present invention is a rechargeable electrolysis cell having a high energy density comparable to liquid fuels and good long-term durability. The fuel cell utilizes a reversible electrolysis reaction to store electricity. As a result, it may achieve a higher energy density than batteries. The charge and discharge process occurs within a closed-loop system, i.e., it does not consume external fuel sources but only takes electricity as an input. This technology may be widely implemented with existing infrastructure, as the electrical grid may be used to supply electricity to charge the apparatus.

A simple embodiment of the inventive cell includes a metal halide salt dissolved in a polar solvent at a fully discharged state. A membrane barrier may or may not be used.

To charge the unit, a current at a predetermined voltage may be applied to split the metal halide salt into the metal element, which deposits on the cathode, and the halogen, which collects on the anode. The halogen may be removed from the cell by a method determined by the halogen state. Certain halides, such as fluoride or chloride, form a diatomic gas which may be collected and stored until system discharge. Other halides, such as bromide, form a liquid (e.g., bromine) which may be separated by density. The metal may be removed from the cell by means of dissolving it in an appropriate ligand and pumping it out.

On discharge, the gas or liquid may be reintroduced into the porous anode at a predetermined rate or amount and consumed by the oxidation-reduction (redox) reaction to return the cell to its discharged state. During discharge, the halogen and the metal crystal undergo reduction and oxidation, respectively, producing a salt dissolved in the electrolyte.

For example, aluminum chloride ($AlCl_3$) may be dissolved in a predetermined polar solvent and electrolyzed. As the system charges, aluminum metal is plated out at the cathode and continues building metallic crystals until the electrolyte is nearly exhausted. Chlorine gas is generated at the anode, removed, and safely stored until system discharge. As the system discharges, the chlorine is released at a predetermined rate or amount to the porous anode. Electrons flow from the metallic aluminum crystals to the anode and reduce the chlorine gas to $Cl^-$. The chloride enters the solution and finishes the oxidation of the $Al+$ metal ions, returning the cell to its discharged state.

For higher theoretical energies, more reactive metals may be used and removed from the cell by ligands in a dissolving electron reaction similar to the Birch reduction discussed elsewhere herein. In these embodiments, the halogen and the metal may be removed from the cell when they are created during charging and may be reintroduced during discharge.

The fuel cell generally comprises an anode, a cathode with an electrical connection to the anode, an electrolyte, and inlets at both the anode and cathode for a reducing agent and an oxidizer, respectively. In contrast to a prior art fuel cell in which hydrogen is pumped to the anode, the present invention pumps a solvated metal ligand, Birch electron, or similarly solvated electron to the anode. A solvent may permeate the anode. In another embodiment, the metal plates out on the cathode and is used in its solid form.

A separate electrolysis cell may also be present. In some embodiments, the fuel cell may also serve as an electrolysis cell. In the electrolysis cell, a membrane may be provided to separate saturated electrolyte from a cathode and solvent used for making the solvated electron.

The "fuel" used in the inventive fuel cell is a metal, such as a metal suitable to make the solvated electron seen in the Birch reduction. Any metal capable of a metal ligand solvent complex may be used as the fuel. For example, the metal may be selected from the group consisting of sodium, lithium, potassium, and combinations thereof. Lithium or potassium may be preferable in some cases due to chemistry concerns or solvent break down. Alternatively, aluminum may be used and the solvated electron step may be skipped entirely.

In some embodiments, the electrolyte is used with a separate solvent which reacts with the metal and forms the solvated electron, which serves as the reducing agent. In some embodiments, the electrolyte and the solvent are separated by a membrane and/or barriers so that only ion exchange occurs between the two. The inventive apparatus may also use a membrane separator to allow only the metal ions to the cathode and not anything else.

In some embodiments, the electrolyte itself serves as the solvent, obviating separation of the fuel cell electrolyte and the solvent used for creating the solvated electron. For example, hexamethylphosphoramide (HMPA) mixed with a suitable crown ether dimethyl formamide (DMF) and any other selected cosolvents may be used.

Any appropriate solvent effective to dissolve the metal salt and the metal itself may be used. For example, the solvent may be selected from the group consisting of anhydrous ammonia, HMPA, ethylamine, methylamine, ethylenediamine (EDA), and a combination of these solvents (i.e., co-solvents).

A halogen is used for the oxidizer in this invention, such as a halogen selected from the group consisting of chlorine, bromine, and fluorine. Chlorine is discussed in detail herein. Bromine or fluorine may be used with minor changes to some of the semi porous separators.

The cathode comprises a hollow, semipermeable tube which conducts electricity. This hollow semipermeable tube allows metal cations through but does not allow the solvent through. In some embodiments, the tube may be eliminated entirely with the use of membrane separators. Membranes may be used to separate the solvated electron solvent and the saturated electrolyte.

In some embodiments, the solvated electron may be substituted with metallic plating on the cathode. This simpler cell with less theoretical capacity may be cheaper and simpler to produce.

Suitable materials for construction of the anode and cathode in the fuel cell conduct electricity, are permeable to the reactants, but not to the electrolyte or solvent, and are not degraded over time by the reactants. The anode material may be any suitable material through which only metal cations from the solvated electrons may permeate. The cathode may be made, for example, of a specially engineered material or a carbon membrane type filter.

In operation, the solvated electron may be pumped to the anode side of the cell. As the solvated electron metal complex contacts the anode, an electron is given up, leaves the anode, and is transferred to the cathode by way of the electrical connection to reduce the halogen. In the process, the electron may perform work e.g., by passing through a load. The metal cation enters the electrolyte and may be facilitated in crossing the cell with a suitable crown ether mixed with a polar aprotic or polar protic solvent which dissolves the subsequent reaction salt as well. Once the metal cation reaches the cathode, the electron has combined with the halogen, making it an ion. For example, sodium discharges an electron and goes into the semipermeable anode as $Na^+$. The $Na^+$ enters the electrolyte and may be facilitated in reacting at the cathode by crown ether dissolved in a polar aprotic solvent. At the cathode, chlorine gas is infused into the semipermeable cathode. The discharged electron travels to the cathode, reducing chlorine to $Cl^-$ The $Cl^-$ combines with the $Na^+$ in an oxidation reaction known in the art and the salt product dissolves into the electrolyte.

As the unit is discharged, the metal salt dissolves into the electrolyte until near saturation. When the concentration of the salt reaches a saturation point it is detected by a sensor. Valves activate to pump out the saturated electrolyte into a temporary storage tank and replace it with unsaturated electrolyte. Once no unsaturated electrolyte remains, the system is fully discharged. The saturated electrolyte is then pumped or gravity fed to a storage tank. Moving saturated electrolytes between tanks achieves higher storage density.

To charge the system, the saturated electrolyte which contains the dissolved metal salt and the polar aprotic solvent, with or without co-solvent, is pumped into the electrolysis cell. This mixture is pumped from an electrolyte storage tank. The saturated electrolyte undergoes electrolysis. Direct current (DC) electrical flow may be used to split the salt, reducing the metal cation at the cathode, to form the metal and halogen reactants which are then separated and pumped (or gravity fed) to storage tanks. A valve may be opened for pressure release and a condensate pump may be activated depending on the components. A pump may also be activated to separate the electron carrier. The saturated solution may be pumped into the electrolysis cell when the concentrations within the cell are below a certain point; the cell may be purged of the unsaturated solution and saturated solution may flow into it. The unsaturated electrolyte is returned to the fuel cell and unsaturated electrolyte storage tank. The metal is then dissolved by the appropriate solvent to make the "solvated electron."

In some embodiments, the tanks may be eliminated at the expense of range.

In some embodiments, a compressor and/or cooler module may be provided operative to re-liquefy the halogen.

In some embodiments, the present invention comprises a machine that reduces chemicals pumped into a circuit.

In some embodiments, the inventive apparatus may be used to produce aluminum without carbon.

Figure 2:
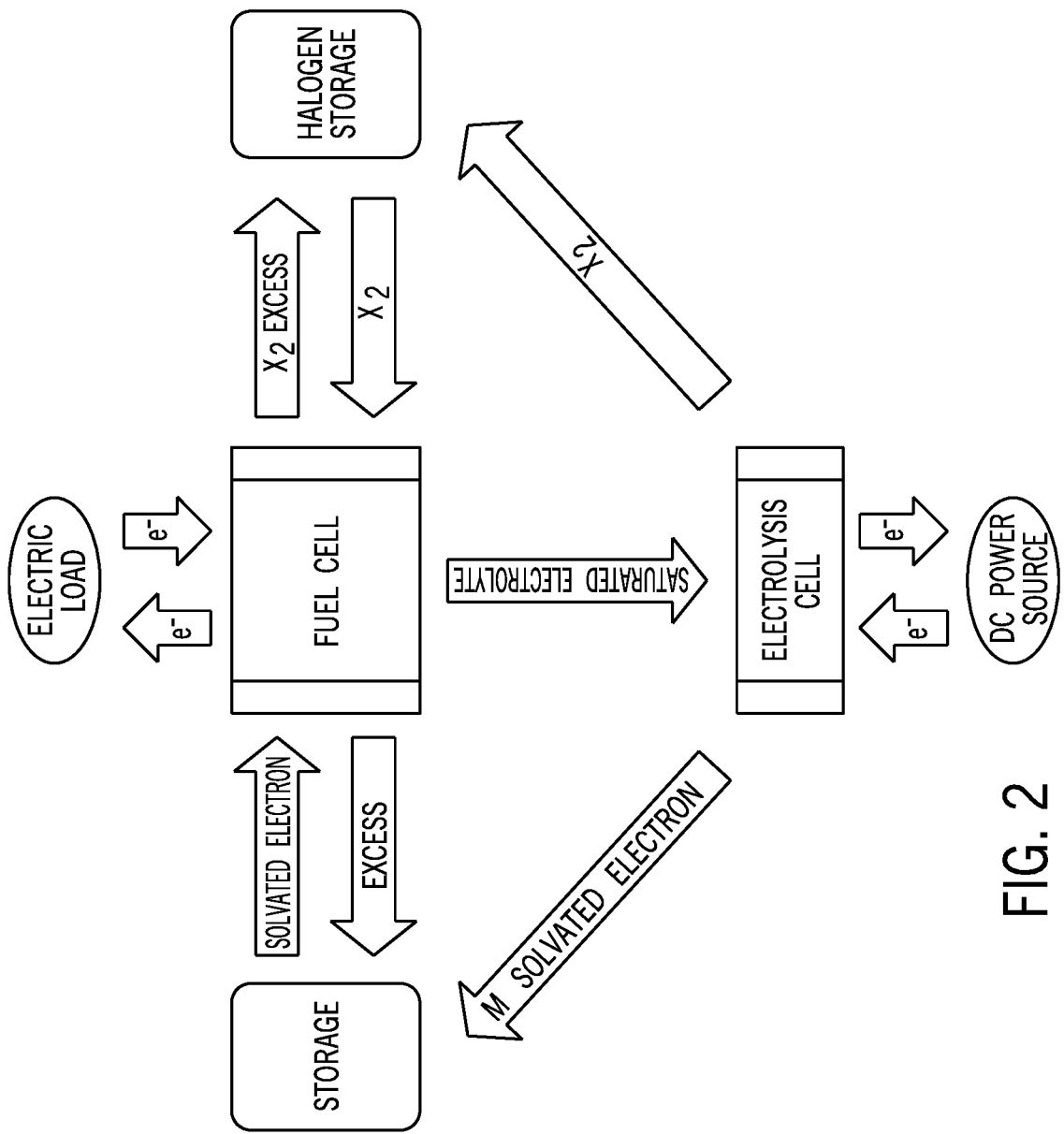
FIG. 2 is a schematic diagram of a rechargeable electrolysis cell system according to another embodiment of the present invention.

Referring to FIGS. 1 through 5, FIG. 1 illustrates a fuel cell system according to an embodiment of the present invention comprising a fuel cell 10, an electrolysis cell 20, solvated electron storage tank 30, halogen storage tank 40, an electrical connection between a cathode and an anode having an electric load 50, and a DC power source 60. During discharge, the fuel cell 10 takes in solvated electron 32 and halogen 42 (identified as $X_2$) reactants and clean electrolyte 22, transfers electrons 52, 54 across the electric load 50, and produces saturated electrolyte 24. Excess solvated electron 34 and excess halogen 44 are returned to their respective storage tanks 30, 40. During charge, the electrolysis cell 20 takes in saturated electrolyte 24 and electricity 62, 64 from the DC power source 60, and produces clean electrolyte 22, solvated electron 32, and halogen 42. FIG. 2 has a similar configuration but does not return clean electrolyte 22 to the fuel cell 10.

Figure 3:
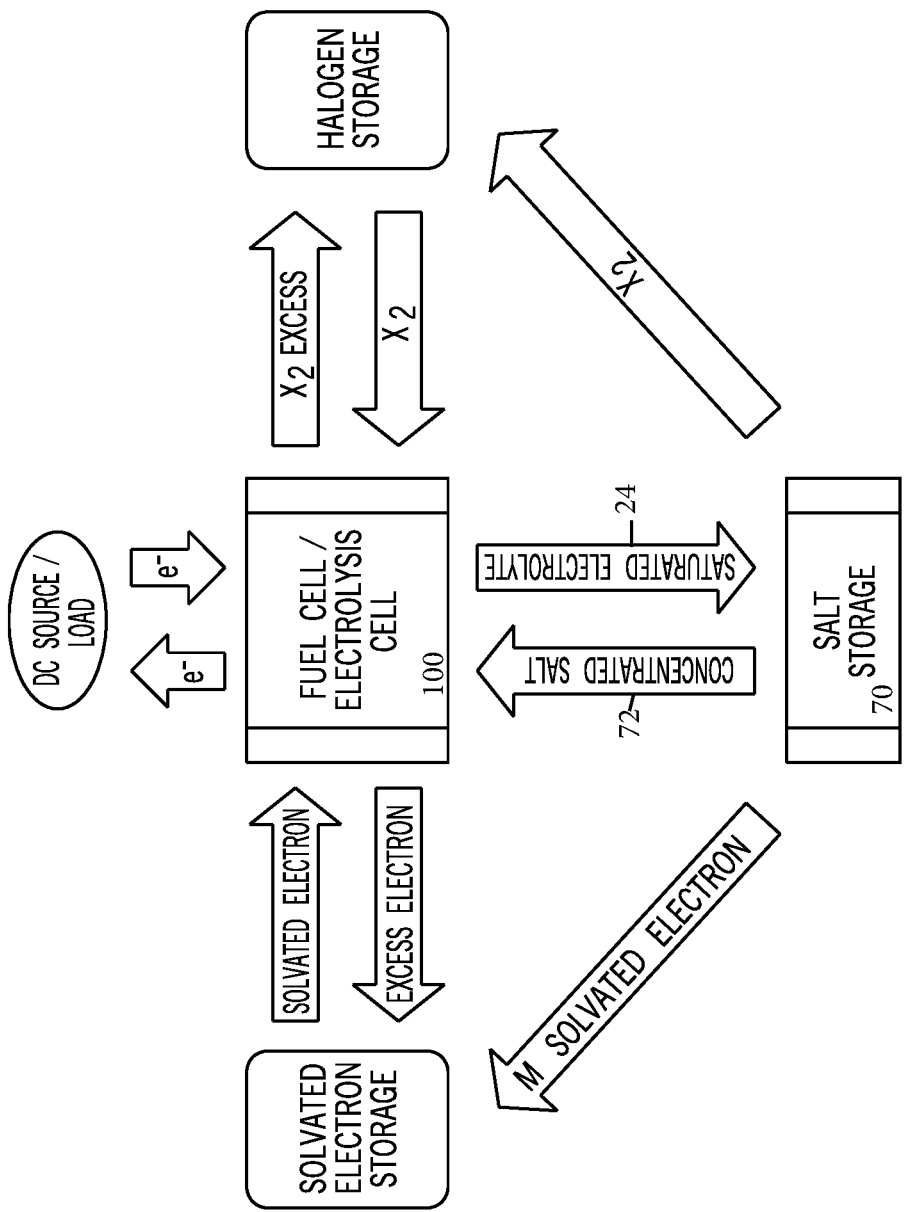
FIG. 3 is a schematic diagram of a rechargeable electrolysis cell system according to another embodiment of the present invention.

FIG. 3 illustrates a fuel cell system in which the fuel cell 100 also serves as the electrolysis cell. In this embodiment, the fuel cell 100 transfers saturated electrolyte 24 to a dissolved salt storage tank 70 during discharge and draws concentrated salt 72 from the salt storage tank 70 during charge.

Figure 4:
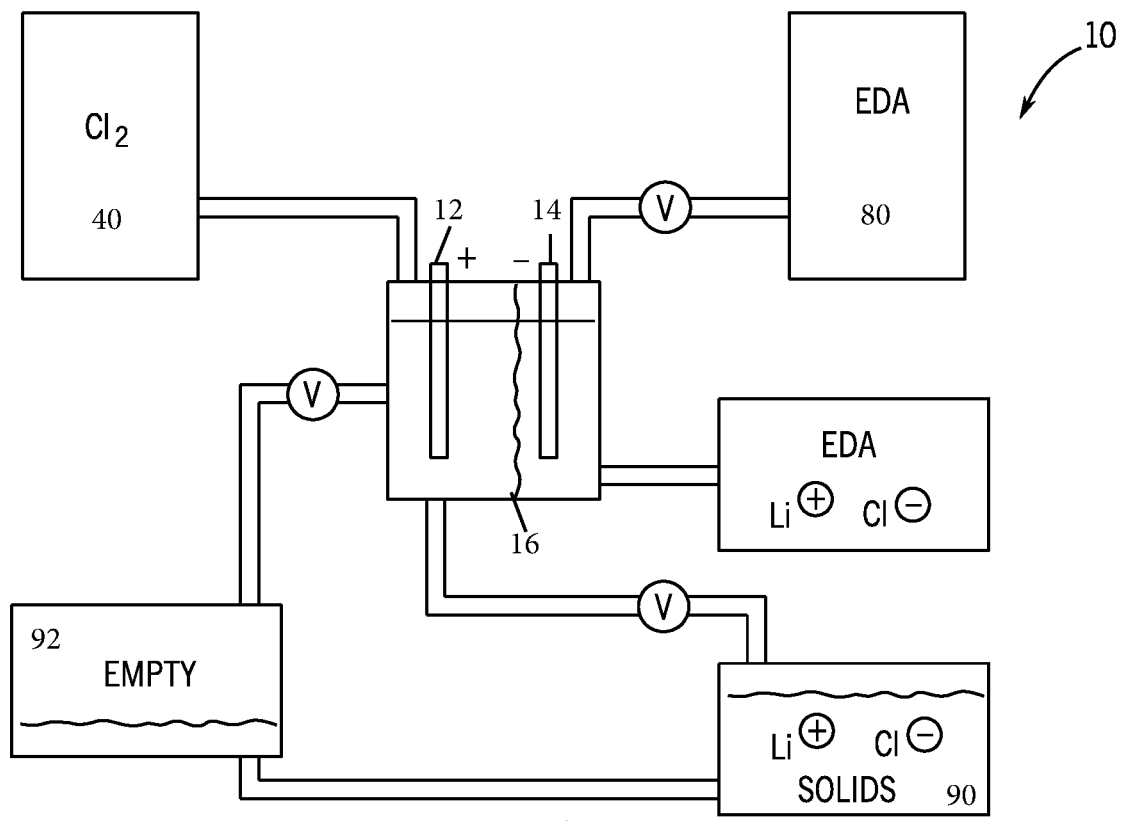
FIG. 4 is a schematic diagram of a rechargeable electrolysis cell system according to an embodiment of the present invention.

FIG. 4 shows an exemplary fuel cell system, wherein the fuel cell 10 has a cathode 12, an anode 14, and a membrane 16 therebetween. The halogen storage tank 40 delivers chlorine and a solvent storage tank 80 delivers ethylenediamine to the fuel cell 10. Saturated electrolyte 24 is transferred between saturated electrolyte tanks 90, 92.

Figure 5:
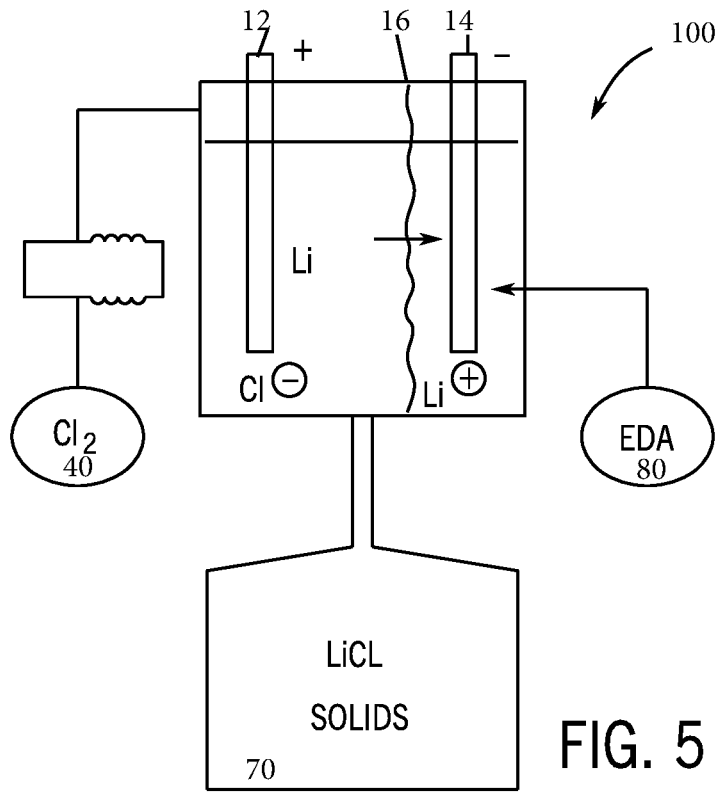
FIG. 5 is a schematic diagram of a rechargeable electrolysis cell system according to another embodiment of the present invention.

FIG. 5 provides a simplified fuel cell system comprising a combination fuel cell/electrolysis cell 100 with a salt storage tank 70.

Figure 6:
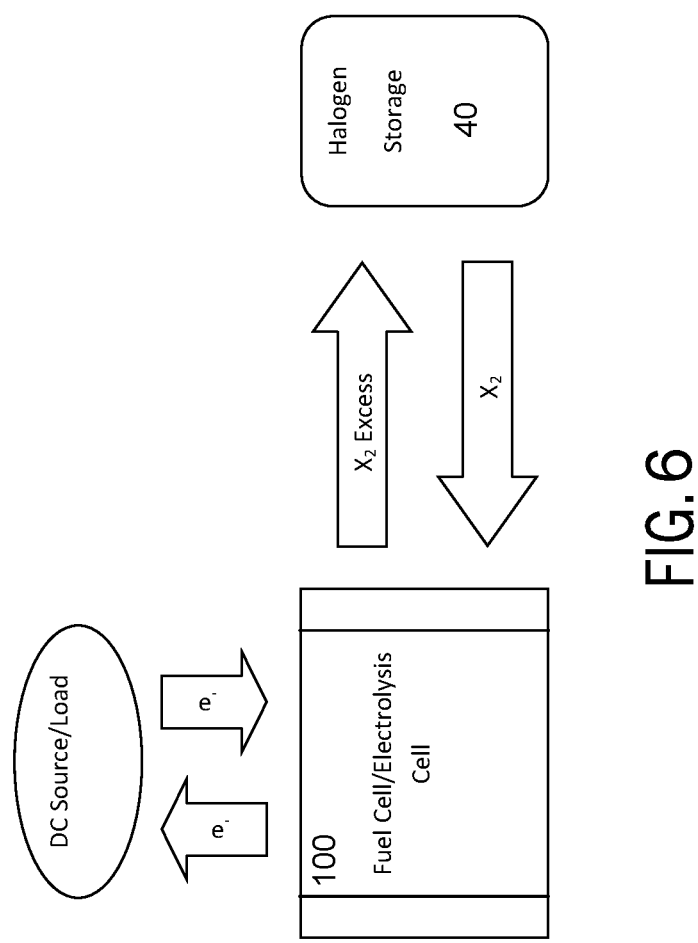
FIG. 6 is a schematic diagram of a rechargeable electrolysis cell system according to another embodiment of the present invention.

FIG. 6 illustrates another simplified rechargeable electrolysis cell comprising a combination fuel cell/electrolysis cell 100 and a halogen storage tank 40.

It should be understood, of course, that the foregoing relates to exemplary embodiments of the invention and that modifications may be made without departing from the spirit and scope of the invention as set forth in the following claims.

What is claimed is:

1. A method of charging and discharging a rechargeable electrolysis cell, comprising:
   a) providing a rechargeable electrolysis cell, comprising:
      i) an anode;
      ii) a cathode having an inlet for an oxidizer;
      iii) an electrical connection between the anode and the cathode;
      iv) an electrolyte; and
      v) a reducing agent selected from the group consisting of a solvated metal ligand, a solvated electron, metal crystal, and a metallic plating on the cathode;
      wherein the oxidizer is a halogen;
   wherein discharging comprises:
   b) providing the reducing agent at the anode and delivering the oxidizer to the cathode; and
   c) transferring an electron from the anode to the cathode by way of the electrical connection through an electrical load, such that the reducing agent is oxidized and the oxidizer is reduced, producing a salt dissolved in the electrolyte; and
   wherein charging comprises:
   d) applying a direct current to convert the salt to the reducing agent and the oxidizer; and
   e) separating the reducing agent and the oxidizer.

2. The method of charging and discharging a rechargeable electrolysis cell of claim 1, further comprising:
   a) sensing a concentration of the salt dissolved in the electrolyte to determine if saturated electrolyte is produced; and
   b) transferring the saturated electrolyte into a first storage tank.

3. The method of charging and discharging a rechargeable electrolysis cell of claim 2, further comprising:
   a) transferring the saturated electrolyte from the first storage tank into a secondary electrolysis cell before applying the direct current; and
   b) transferring the separated reducing agent to a second storage tank and transferring the separated oxidizer to a third storage tank.

4. The method of claim 1, wherein the solvated electron is a Birch electron.

* * * * *